United States Patent
Hoffman et al.

[15] 3,673,493
[45] June 27, 1972

[54] ONE-PROBE METHOD AND APPARATUS FOR DETECTING, CORRELATING, AND CLASSIFYING DEFECTS IN TEST MEMBERS

[72] Inventors: John P. Hoffman, Coopersburg; Robert C. Booth, Bethlehem, both of Pa.

[73] Assignee: Bethlehem Steel Corporation

[22] Filed: April 21, 1970

[21] Appl. No.: 30,583

Related U.S. Application Data

[63] Continuation-in-part of Ser. No. 816,762, April 16, 1969, abandoned.

[52] U.S. Cl. ..............................................................324/37
[51] Int. Cl. .................................................G01r 33/12
[58] Field of Search ............................324/37, 40; 346/33 F

[56] References Cited

UNITED STATES PATENTS

| | | | |
|---|---|---|---|
| 3,445,672 | 5/1969 | Marks | 346/33 F |
| 3,534,258 | 10/1970 | Forster | 324/37 |
| 3,290,167 | 12/1966 | Wood et al. | 324/37 |
| 3,262,123 | 7/1966 | Crouch | 324/37 |
| 3,568,051 | 3/1971 | Vild | 324/37 |

FOREIGN PATENTS OR APPLICATIONS

| | | | |
|---|---|---|---|
| 46,069 | 1/1963 | Poland | 324/41 |

*Primary Examiner*—Robert J. Corcoran
*Attorney*—Joseph J. O'Keefe

[57] ABSTRACT

Nondestructive test apparatus detects both straight and skewed defects in test members such as steel bars and billets having either curved or flat surfaces. Detecting means, including a probe adapted to scan a surface of said member cyclically during relative lengthwise movement therewith, produces electrical signals representative of defects detected in said member. Electrical signals cause defect pulses to be produced and these pulses are coordinated with probe position pulses in electronic circuits which classify the defects according to location, or location in combination with level of defect severity and/or length, in a longitudinally extending section of the test member. A signal correlator may be added to reject noise and false defect pulses as well as to accommodate skewed defects when either or both such situations are encountered. The finally processed defect pulses are utilized, for example, to activate reworkable or rejectable defect markers downstream of the probe over a section of the scanned surface where the defects occurred in said member.

23 Claims, 3 Drawing Figures

ONE-PROBE METHOD AND APPARATUS FOR DETECTING, CORRELATING, AND CLASSIFYING DEFECTS IN TEST MEMBERS

CROSS-REFERENCE TO RELATED APPLICATION

This application is a continuation-in-part of our pending application Ser. No. 816,762, filed Apr. 16, 1969, now abandoned.

BACKGROUND OF THE INVENTION

1. Field of the Invention

This invention relates broadly to nondestructive testing of test members for defects. More particularly, it relates to a method and apparatus for detecting and classifying defects in test members. Such test members may consist of rod, bar, billets, tubular, pipe, sheet and plate products. The method of testing may be either electromagnetic, ultrasonic, electromechanical, radiant energy, and the like, or combinations of these, in which defect detecting means produces electrical signals representative of the defects in said member.

2. Description of the Prior Art

Consumers of ferrous and nonferrous metal products make ever-increasing demands for higher and more uniform quality of products. One method used to try to meet these demands is to employ nondestructive testing equipment in quality control systems and to incorporate such systems into production facilities. However, attempts to utilize prior art testing apparatus in, for example, contemporary hot rolled steel bar or billet production facilities have led to a number of deficiencies. Generally, such apparatus was either too insensitive, or failed, because of noise, to recognize certain defects. In addition, such apparatus was too slow acting to properly detect, classify, and mark, if desired, both straight and skewed defects with equal precision and accuracy, for example, bars as large as 5 inches in diameter and larger, or bars moving at high speeds as fast as 130 fpm, as well as those having only a fraction of the diameter or moving at a much lower rate of speed. Moreover, such apparatus would not locate defects nor classify them according to location in combination with defect severity and/or length, in a particular longitudinally extending section of the product, so as to facilitate improved manual or automatic reconditioning or disposal of products having defects.

SUMMARY OF THE INVENTION

One of the objects of this invention is to provide improved method and apparatus for detecting and locating defects in test members.

A further object of this invention is to provide said apparatus with the capacity for locating, and marking if desired, the defects and classifying said defects according to location in combination with defect severity and/or length in a particular longitudinally extending section of said test member.

Another object of this invention is to provide said apparatus with the capability of operating at an improved level of sensitivity to detect a greater number of true defects than heretofore, yet reject noise and false defect signals.

Still another object of this invention is to provide said apparatus with the capability of accommodating the detection of both straight and skewed defects.

The foregoing objects can be obtained with defect detecting and classifying apparatus having highly sensitive defect detecting means which includes a probe adapted to scan a surface of the test member cyclically during relative lengthwise movement therewith and produce electrical defect signals incident thereto. These signals are fed to differential comparators which classify the defects according to first and second level of defect severity and produce respective defect pulses. The second level defect pulses are fed directly to storage and marking circuits. The first level defect pulses are either transmitted directly for further processing, or are fed through a signal correlator when noise and random false defect signals are present and/or skewed defects are to be accommodated. Correlation is done by comparing an instantaneous defect pulse with a stored pulse from a single, multiple or related fractional scanning cycle history, whereby when coincidence occurs only a first level true defect pulse is passed, thus rejecting the noise and false signals. In either case, the first level defect signals are transmitted to a plurality of gates for classifying the defects according to length and location in a longitudinally extending section of said member where the defect occurs. A probe-driven encoder generates a synchronous sequence of scanning position pulses which operate in designation and classification circuits to generate a sequence of gate control pulses which act on said gates one at a time. Each gate is part of a different one of a plurality of location-associated series of circuits which also include a tapped shift register and selector switch for providing preselectable time delays for various predetermined velocities of the test member during movement between detecting and marking stations, and separate defect storage and marking circuits for each said section of the test member. Both first and second level defect pulses are utilized, for example, by a defect marking unit location downstream of the probe. One or more different colors of paint designating different levels of defect severity are applied to the test member surface at the defect location and for the length of its occurrence.

DESCRIPTION OF THE PREFERRED EMBODIMENT

Figure 1:
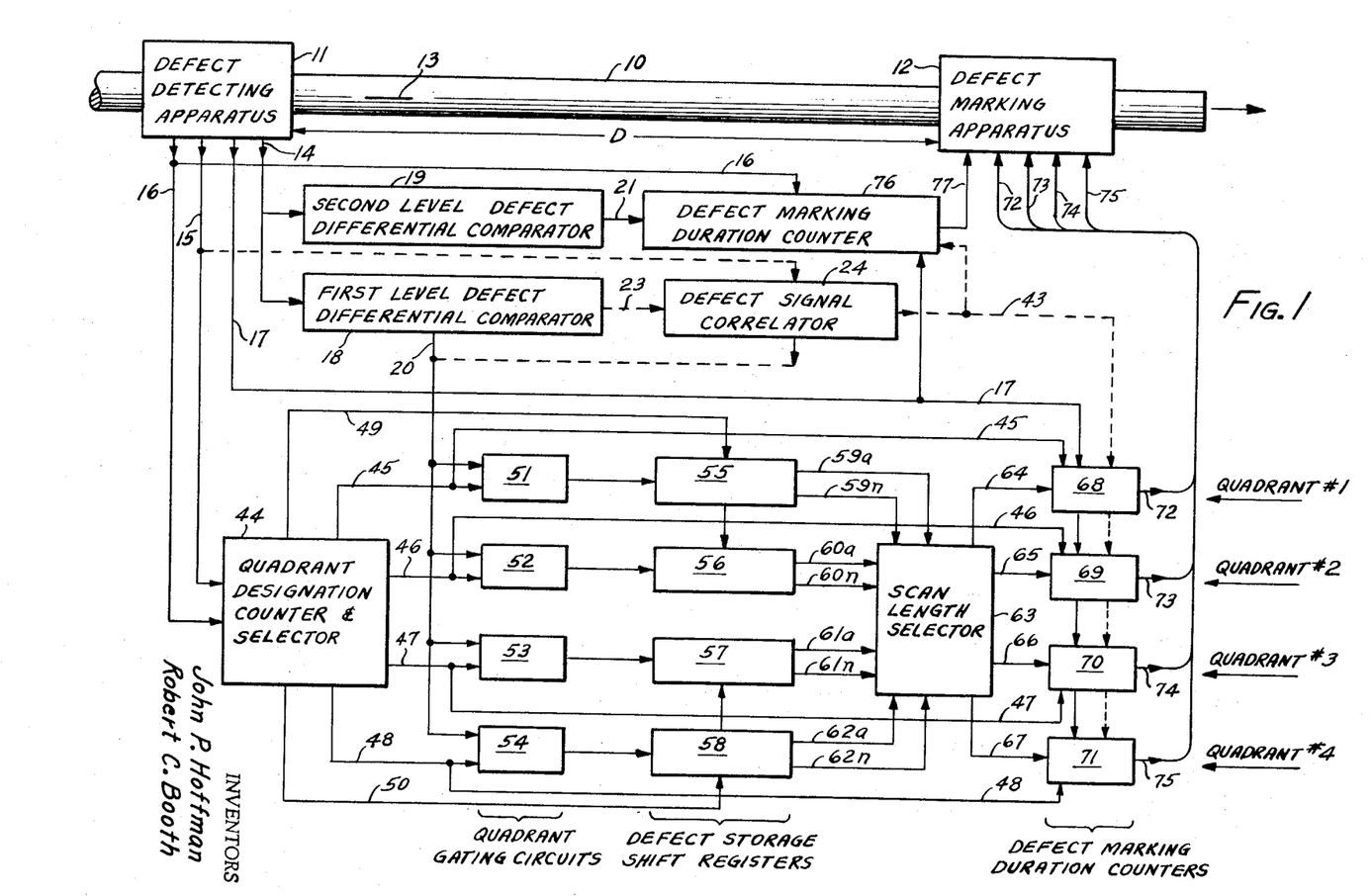
FIG. 1 is a schematic diagram showing one embodiment of the invention in, for example, the production of hot rolled steel bars.

Referring to the drawings, particularly FIG. 1, there is generally shown a continuous inspection station in, for example, the production of hot rolled round steel bars 10 of up to about 5 inches in diameter and larger. Bar 10 is normally caused to move longitudinally at a constant velocity of up to about 130 fpm and higher and during the course of movement is passed through defect detecting apparatus 11. Then, for example, it is passed through defect marking apparatus 12 which is located a known distance D downstream of the apparatus 11. Bar 10 may instead be passed through bar reconditioning and disposal equipment (not shown) which is operative in dependency upon the various defect signals produced by apparatus of this invention. For purpose of illustration, bar 10 is shown with a straight defect 13, that is, one that extends parallel to the longitudinal axis of bar 10, rather than skewed with respect to said axis.

The precision with which defects may be located by using this invention is predicated in part upon sub-dividing each bar 10 circumference into a predetermined number N of longitudinally extending, incremental surfaces adjacent each other. To simplify defect marking these incremental surfaces are grouped into say four sections such as the four surface quadrants of bar 10. The sub-division and grouping are shown diagrammatically in FIG. 2.

Figure 2:
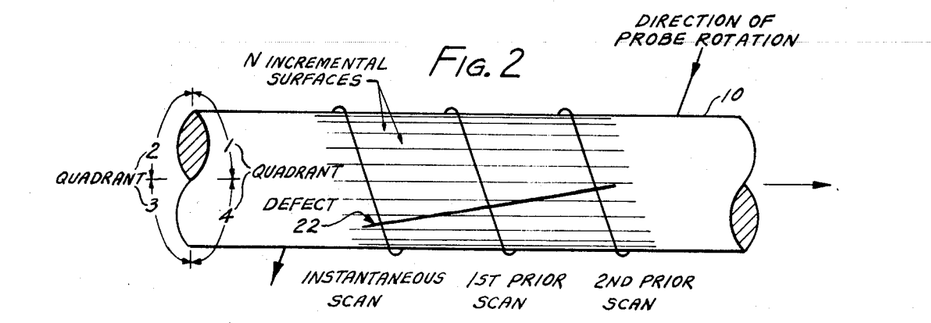
FIG. 2 is an enlarged plan view of a portion of the test bar showing diagrammatically a skewed surface defect and the pathway of the scanning probe while traversing longitudinally extending incremental surfaces of the bar.

Defect detecting apparatus 11 may be based upon any one or a combination of the aforementioned methods of nondestructive testing, provided it produces electrical signals which are representative of the defects in bar 10. One such method well suited for bar 10 quality control systems is the eddy current method which is given preference herein. Apparatus 11 includes defect detecting means having a well-known electromechanical scanning probe assembly (not shown), or simply a scanning probe, which is caused to rotate about bar 10 at essentially a constant speed of about 1,600 rpm while bar 10 is passed coaxially through the probe assembly. An eddy current defect detector is located within the probe and positioned close to the surface of bar 10. Thus, an electrical signal will be produced while the surface of bar 10 is scanned cyclically by the probe. Hence, during relative lengthwise movement of bar 10 with the probe, the probe follows a helical pathway as shown in FIG. 2.

The defect detector is powered from within apparatus 11 by electronic devices including a high-gain amplifier having an adjustable gain control. This control is set to provide a high level of detector sensitivity, if desired, so as to provide electrical signals at lead 14 which represent the defects in bar 10 which it is desired to detect. Frequently at high levels of sensitivity, the electrical signals comprise noise and randomly occurring false defects, caused by mill scale and the like, which are intermixed with true defect signals. As used herein, the term "true defects" are those which recur in the same or adjacent incremental surfaces in at least one successive scanning cycle.

Also included in defect detecting apparatus 11 is a conventional angular encoder (not shown) driven by, and in synchronism with, the scanning probe. The encoder generates a sequence of N incremental scanning position pulses per scanning cycle, or revolution of the probe. N corresponds to the number of incremental surfaces into which bar 10 circumference was sub-divided. Thus, a pulse is provided to coordinate the occurrence of defects in each incremental surface of bar 10 with angular displacement of the probe during each scanning cycle irrespective of bar 10 diameter. The scanning position pulses are transmitted over lead 15 for use as will be explained below.

The encoder also generates a key pulse which starts at the beginning of a scanning cycle, endures for as long as, or longer, than two scanning cycles, and is transmitted over lead 16 for use as will also be explained below.

In addition to having the scanning probe and encoder, the defect detecting apparatus 11 also includes means (not shown) for producing a bar-no bar signal when the bar enters - leaves the scanning probe, respectively. This signal is transmitted over lead 17 for use as will also be explained below.

Still referring to FIG. 1, the electrical defect signals transmitted over lead 14 are fed to as many defect signal detecting means as may be described. In the embodiment shown, these means consist of first and second level defect differential comparators 18 and 19, respectively. Such levels may have correspondence with reworkable and rejectable levels of defect severity, or other levels as desired, where the first level is the lowest order of magnitude. Comparators 18, 19 produce first and second level defect pulses, respectively, whenever the electrical signals over lead 14 differ from at least one predetermined waveform associated with each level of the two levels of defects to be detected.

In applications where recognition of the predetermined waveforms are relatively simple, such as determining excesses of the electrical signal over given but different amplitudes, then comparators 18, 19 may consist of level detectors each operating against an internal reference source adjusted to their given amplitude. Where recognition patterns are more difficult, such as determining both differences in amplitude and waveform duration, then comparators 18, 19 may consist of waveform analyzers or include both level detectors and pulse width discriminators operating against respective reference sources adjusted to predetermined values thereof. Regardless of their form, it is contemplated that comparators 18, 19 will produce first and second level defect pulses at leads 20, 21, respectively, whenever the electrical signals transmitted over lead 14 exceeds the aforesaid predetermined levels of defect severity.

Ordinarily, the first level defect pulses are transmitted over lead 20 to quadrant gates described below when the electrical signals on lead 14 are relatively free of electrical noise and false defect signals. The latter signals are generally of equal magnitude and intermixed randomly with true defect signals. However, when false defect signals are present, or when bar 10 has a skewed defect 22 such as is shown in FIG. 2 or bar 10 rotates slightly axially while passing through defect detecting apparatus 11, then the FIG. 3 defect signal correlator 24 is incorporated into the FIG. 1 embodiment and first level defect pulses are fed to it from comparator 18 over lead 23 (shown dotted in FIG. 1 and solid in FIG. 3).

Figure 3:
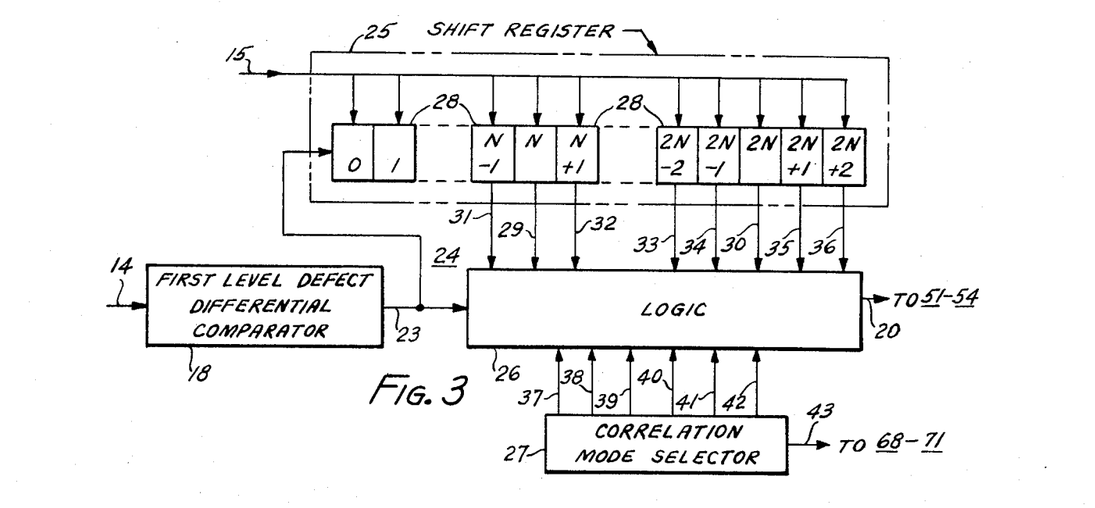
FIG. 3 is a block diagram of a signal correlator utilized in the embodiment shown in FIG. 1.

Referring to FIG. 3, defect signal correlator 24 preferably is the type disclosed in our copending application Ser. No. 816,709, filed Apr. 16, 1969, now U.S. Pat. No. 3,609,683 issued on Sept. 28, 1971, and entitled "Electronic Signal Correlating Apparatus," excluding the analog signal detecting means shown therein which corresponds with comparator 18 herein. Briefly, correlator 24 includes shift register 25, control logic 26 and correlation mode selector 27. These circuits receive the first level defect pulses over lead 23 and operate to separate and pass true first level defect pulses over lead 20 and reject the other pulses. Correlation takes place whenever coincidence occurs as a result of a comparison between a recurring instantaneous true defect pulse and a stored true defect pulse from either the same or a leading or lagging increment of a single, multiple or related fractional cycle of probe scanning history. In this manner, correlator 24 not only rejects noise and false defect signals with precision and accuracy but also accommodates straight defects 13 as well as skewed defects 22.

Shift register 25 is constructed, for example, of a predetermined number of serially-connected binary storage stages 28, each consisting of an integrated circuit type of device having a shift circuit connected to lead 15. Thus, the encoder supplies the scanning incremental position pulses as shift pulses to the shift circuits. Shift register 25 comprises stage O, and M sections of at least N stages 28 per section, plus additional incremental stages as noted below. Stage O, or a setting stage, is located at shift register 25 input circuit and receives the instantaneous first level true and false defect pulses over circuit 23. These pulses generally occur somewhere within a scanning cycle increment and stage O stores them temporarily, that is for the remainder of said increment, before transferring them to subsequent stages in response to the shifting pulses on lead 15.

The number of M sections of shift register 25 corresponds to a predetermined number of prior cycles, or history, of defect pulses that are to be stored. N corresponds to a predetermined number of incremental storage stages per section, or cycle, and is equal to the N incremental position pulses at lead 15, and also corresponds to the number of incremental surfaces into which bar 10 circumference is subdivided. The actual numerical value of both M and N is governed by the degree of reliability and precision of signal correlation that is to be achieved, there being practical limitations for both values. For example, the larger M is made, the greater the number of first level defect pulses that become involved in determining whether the pulse is true or false, thus increasing the reliability of such determination. Further, the larger N is made, the greater number of longitudinally extending surface increments there are in every scanning cycle. This increases the precision with which a true defect can be located in a given cycle, and correspondingly the location in a longitudinally extending surface of bar 10.

Shift register 25 includes a number of output circuits which provide for several degrees of reliability of operation as well as for accommodating leading and lagging true and false first level defect pulses in successive scanning cycles with regards to both straight and skewed defects 13, 22. These output circuits are derived by tapping the output of one or more preselected stages 28. In its simplest form, shift register 25 consists of one section of N stages per section and stage N output is fed to circuit 29. For greater reliability, two sections of N stages per section are provided with stages N and 2N outputs fed to respective circuits 29, 30, and so on. To accommodate leading and lagging, or skewed, true and false first level defect pulses in a one-section shift register 25, an additional stage 28 must be added and stages N, N−1 and N+1 outputs fed to respective circuits 29, 31 and 32. In a two-section shift register 25, two additional stages 28 should be added and stages N, N−1, 2N, 2N−2, 2N−1, 2N+1 and 2N+2 outputs fed to respective circuits 29, 31, 32, 30, 33, 34, 35 and 36. It will be apparent that a correlator with the greater versatility would be the latter embodiment. For this reason and purposes of illustration the shift register 25 shown in FIG. 3 includes 2N+2 stages.

After true and false first level defect pulses enter stage O, they are transferred incrementally through successive stages in response to the shifting pulses at lead 15 which are applied simultaneously to the shift circuit of each stage 28. Pulse transfer continues until each pulse is passed out of the last stage in shift register 25. Shifting occurs at the negative-going, or trailing, edge of the shifting pulses.

Circuit means operating under one of a number of correlating modes is provided for enabling the comparison of comparator 18 output with one or more shift register outputs at leads 29–36. This circuit means passes true first level defect pulses when coincidence occurs between an instantaneous and a stored true first level defect pulse under one of the number of correlating modes explained below. Random false first level defect pulses are rejected for the lack of coincidence with another false defect pulse.

The above-mentioned circuit means includes control logic means 26 operating under control of correlation mode selector means 27. Control logic means 26 consists of a plurality of NAND gates which are circuited to receive instantaneous true and false first level defect pulses over circuit 23 and stored true and false first level defect pulses over circuits 29–36. These NAND gates inhibit the passage of all pulses until enabled in one or more combinations by one or more correlation mode selection signals received from selector means 27.

Although there are many possible correlating modes that can be derived, only six have been chosen for illustrative purposes for which selector 27 produces corresponding correlation mode selection signals. These signals are fed over leads 37–42 to the NAND gates in control logic means 26. The signal on lead 37 enables correlator 24 to be by-passed, if desired, so that first level pulses received on lead 23 are immediately transmitted on lead 20. The signals on leads 38–42 enable a comparison between comparator 18 output and one group of shift register 25 outputs at either N stage, 2N stage, N and N±1 stages, 2N and 2N±1 stages, or 2N, 2N±1, and 2N±2 stages, respectively. As a result of said comparison, a true first level defect pulse is passed by control logic means 26 over lead 20 to quadrant gates described below, whenever coincidence occurs between a recurring instantaneous and a stored true first level defect pulse from either the same or a leading or lagging increment of a single, multiple or related fractional cycle of scanning history.

Correlation mode selection means 27 also provides signals over lead 43 to circuits yet to be described for identifying the correlating mode of first level defect pulses appearing at lead 20.

Turning now to FIG. 1, the first level defect pulses transmitted over lead 20 are processed through separate quadrant classifying circuits. These include quadrant designation counter and selector 44 which in itself has a counter that receives the scanning incremental position pulses and divides them into groups, such as quadrants, for each revolution of the scanning probe. The counter is reset by the key pulse fed over lead 16 and is responsive to both leading and trailing edges of the key pulse. As a result, selector 44 generates a sequence of four quadrant gate control pulses which are transmitted over leads 45–48 and each pulse is present only during a different adjacent quadrant of probe scanning.

Quadrant designation counter and selector 44 also includes internal circuits that are responsive to both the incremental position and the key pulses for generating first and second shift pulses in synchronism with the gate control pulses. The first and second shift pulses endure for the same period as the first two and last two quadrant gating pulses, respectively, occur every other scanning cycle, and are transmitted over leads 49, 50, respectively.

The first level defect pulses are fed over lead 20 to each of a plurality of quadrant classification circuits, more specifically, to the input side of each quadrant gating circuit 51–54. These gates operate sequentially under control of the gate control pulses fed over leads 45–48, respectively, and pass only those defect pulses which correspond to defects occurring in its respective quadrant of bar 10 surface.

The outputs from quadrant gates 51–54 are fed to the input side of quadrant defect storage shift registers 55–58, respectively. Each of these shift registers consists of a series of binary storage stages similar in construction and operation to that of shift register 25, except that registers 55, 56 receive the first shift pulse noted above and registers 57, 58 receive the second shift pulse. Thus, a first level defect pulse is transferred from stage-to-stage every other revolution of the scanning probe, rather than after every incremental pulse in each scanning cycle as in shift register 25.

Each quadrant shift register 55–58 also includes a plurality of tapped outputs at a predetermined number of stages which are circuited to leads 59a–59n, 60a–60n, 61a–61n and 62a–62, respectively. Thus, each quadrant shift register 55–58 provides a choice of defect pulse time delays which correspond to one of a number of predetermined velocities of bar 10 movement, thereby compensating for differences in bar 10 length per scan while maintaining a fixed distance D between detection and marking stations. One other feature of this arrangement is that the incremental surface orientation (quadrant) of a defect in bar 10 is dependent upon probe position, rather than on bar 10 velocity. Therefore the shifting of defect pulses through shift registers 55–58 is independent of the time delay for which they are selected.

The plurality of leads 59a–59n, 60a–60n, 61a–61n, and 62a–62 are connected to respective quadrant sections of scan length selector 63 where a predetermined one of the tapped outputs of each shift register 55–58 is preselected simultaneously. Ordinarily selector 63 will cause the selection of the tap at the last stage of each shift register 55–58 when the lowest bar 10 velocity is contemplated. The number of taps preceding the last stage that selector 63 cause the selection of will increase as bar 10 velocity increases until no more taps are available, thus using the shortest predetermined delay time available in the shift register. Thus, the first level defect pulses occurring in each of the four quadrants of the scanning cycle and delayed incrementally are made available sequentially for use at selector 63 output leads 64–67, respectively.

Leads 64–67 are connected to quadrant defect marking duration counters 68–71 when it is desired to store a first level defect pulse for a period longer than say the duration between scanning incremental position pulses for use in, for example, defect marking circuits. Each counter 68–71 includes a binary pulse counter which is set when a first level defect pulse appears at leads 64–67, respectively, and is clocked by a gate control pulse transmitted over leads 45–48, respectively. As long as defect pulses are present on leads 64–67 the respective counter 68–71 will produce a quadrant defect pulse at its respective output lead 72–75.

Each counter 68–71 is arranged to reset itself and terminate the quadrant defect pulse two scanning cycles after the last defect pulse is received, except when correlator 24 is incorporated into the defect detecting and classifying apparatus. In this case, each counter 68–71 is modified to respond to the correlation mode identification signals transmitted over lead 43 (as shown by dotted line in FIG. 1), so as to reset itself after as many scanning cycles as were selected for defect signal correlation. In addition, counters 68–71 are circuited to be enabled to be set in the presence of the bar-no bar signal transmitted over lead 17 and automatically reset upon the termination of said signal. Each quadrant defect pulse appearing at leads 72–75 may be utilized for marking or other purposes as described below.

Still referring to FIG. 1, the second level defect pulses transmitted over lead 21 are fed directly to defect marking duration counter 76 which is constructed substantially the same as counters 68–71 with two exceptions. Counter 76 is clocked by the key pulse transmitted over lead 16 so as to be responsive over an entire scanning cycle, rather than in only one quadrant as are counters 68–71. Further, counter 76 is adapted to be self-resetting after a considerably higher number of scanning cycles than counters 68–71 so that the second level defect pulse may start almost instantly after detection, rather than after a time delay as provided by shift registers 55–58. This has the advantage of making second level defect marking distinctive over first level defect marking, and in addition would provide control lead time for automatic reconditioning equipment. The second level defect pulses processed by counter 76 appear at lead 77.

Both first and second level defect pulses appearing at leads 72–75 and 77 may be utilized to activate defect marker apparatus, to control automatic bar reconditioning and/or disposal equipment, or to drive computerized defect analysis or control equipment, indicators, recorders and the like. For purposes of illustration herein, these pulses are transmitted to a plurality of defect marker units (not shown) in defect marking apparatus 12. Each marker unit may, for example, consist of a solenoid operated paint sprayer located in a radial plane perpendicular to bar 10 and be activated in response to one of the defect pulses. Such marker units may be grouped into first and second predetermined numbers thereof, each group capable of spraying a different color of paint to mark classified defects according to level of severity. For instance, yellow paint could be used for the first group and red paint for the second group, these signifying first and second levels of defect severity, respectively.

In one marking arrangement, the first group of marker units would include four markers with yellow paint, one located in each quadrant about bar 10, that would be responsive to quadrant defect pulses transmitted over leads 72–75 to mark bar 10 according to defect severity, length for at least the number scanning cycles the defect was existent, and location in one of the longitudinally extending sections, or quadrants, of bar 10 surface.

In a second marking arrangement, the second group of marker units would be added to the first arrangement and would consist of a single marker unit with red paint, located say between the first and last quadrants, that would be responsive to the second level defect pulse transmitted over lead 77.

In a third marking arrangement, the second marking arrangement would be modified whereby each marker unit in the first group of marker units would be responsive to the second level defect pulse transmitted over lead 77, instead of the separate pulses transmitted over leads 72–75.

In a fourth marking arrangement, the second marking arrangement would be modified whereby each marker unit in the first group of marker units would be responsive to both the first and second level defect pulses transmitted over leads 72–75 and 77.

In a fifth marking arrangement, the second group of marker units would be added to the marker units of the first arrangement and would consist to four marker units with red paint located adjacent those with yellow paint. In this arrangement, the four marker units in the first group would be responsive to the defect pulses transmitted over leads 72–75 only when there was no pulse at lead 77, and the second group would be responsive to the defect pulses transmitted over leads 72–75 only when there was a pulse at lead 77.

As can be appreciated from the foregoing discussion numerous possible marking arrangements exist with which defects may be classified according to level of seventy, length and/or location in a quadrant of bar 10 surface. Generally, the selection of a marking arrangement in practice is governed by the type of marking used in subsequent manufacturing operations, or by personnel operating the manufacturing facility.

OPERATION

In operation, when the scanning probe (not shown) detects straight defect 13 in the surface of bar 10, then an electrical signal is transmitted over lead 14 to comparators 18, 19. Assume that defect 13 was several scanning cycles long and that it exceeded the first but not the second level of defect severity. Further, that the defect signal was sufficiently free of noise and false defect content that correlator 24 was not required. Then, comparator 19 would not have been activated, but comparator 18 would have produced a first level defect pulse. This defect pulse is transmitted over lead 20 to the input of each gating circuit 51–54. If defect 13 occurred in say the fourth quadrant of bar 10 surface, then the sequence of gate control pulses for the first three quadrants that are fed over leads 45–47 will have been generated and ceased without classifying any pulses through gates 51–53.

When the last quadrant gate control pulse is generated and fed over lead 48, gate 54 will be enabled to pass all defect signals representing defects located in the fourth quadrant of bar 10 surface. The first level defect pulse representing defect 13 will then enter shift register 58 and will be transferred through successive stages, one stage for each two revolutions of the scanning probe. After a predetermined number of scanning cycles, which are related to the velocity of bar 10 and distance D, the first level defect pulse appears at one of the tapped outputs at leads 62a–62n. Upon passing through scan length selector 63, this pulse sets defect marking duration counter 71 and activates the yellow paint spraying defect marker unit which is responsive to the pulse that appears at lead 75. This marker unit will remain activated until counter 71 is reset as described above, that is, until after the last scanning cycle in which a defect pulse is produced in the fourth quadrant.

Defects occurring in other quadrants will produce defect pulses that will be processed only through their respective series of circuits. Their quadrant marker units will operate in a manner similar to that described above.

If defect 13 had exceeded the second level of defect severity, then both comparators 18, 19 would have produced first and second level defect pulses, respectively. The first level defect pulses will be processed as described above whereby the fourth quadrant yellow paint spraying marker unit is activated. In addition, the second level defect pulse sets counter 76 and activates the red paint spraying defect marker unit in apparatus 12 which is responsive to the pulse that appears at lead 77. This marker unit will also remain activated until counter 76 is reset as described above.

When the characteristics of the electrical defect signals transmitted over lead 14 are such as to include electrical noise, or random false defects having a magnitude greater than the first level of defect severity, then correlator 24 is incorporated as described above. The true first level defect pulse produced by comparator 18 is inserted in the O, or setting, stage of shift register 25 by way of lead 23. One scanning cycle later this pulse will have advanced through the incremental stages to the N stage. If the N correlating mode is established by selector 27, then the pulse state of the N storage stage is compared with the instantaneous pulse state of comparator 18 output, said comparison being performed in logic means 26. When coincidence occurs, a true first level defect pulse is transmitted over lead 20 and the false defect signals are rejected.

Alternatively, if the 2N correlating mode is established by selector 27, then the comparison of true defects detected is made in two scanning cycles. The first, true first level defect pulse advances from O stage to the N stage in the first scanning cycle and from the N stage to the 2N stage in the second scanning cycle. The second true defect pulse advances from O stage to the N stage in the second scanning cycle. Then the pulse state of the N and 2N storage stages are compared with the instantaneous state of comparator 18 in logic means 26. When coincidence occurs, a true first level defect pulse is transmitted over lead 20 and the false defect signals are rejected.

The possibility exists that bar 10 may be manufactured with a skewed defect 22, or that a bar with a straight defect 13 may rotate slightly axially during movement through defect detecting apparatus 11. To accommodate these conditions, correlator 24 is incorporated as described above and is provided with correlating mode selector 27 capable of being set to correlate the first level defect pulses with the first prior scanning cycle for N or N±1 incremental surface positions, or to correlate the first level defect pulses with the second prior scanning cycle for 2N, 2N±1 or 2N±2 incremental surface positions.

During the first scanning cycle skewed defect 22 is detected in say the last incremental surface position in the fourth quadrant. In the second and third scanning cycles, defect 22 is detected in one and two incremental surface positions, respectively, leading the position of detection in the first scanning cycle. Comparison of the instantaneous pulse state of comparator 18 with the pulse states of the respective storage stages under one of the above mentioned correlating modes is also performed in logic means 26. When coincidence occurs, a true first level defect pulse is transmitted over lead 20 and the false defect signals are rejected.

MODIFIED EMBODIMENT

In the foregoing embodiment there was exemplified a production facility having a station for inspecting defects in a moving hot rolled round steel bar 10. There are some installations requiring inspection of moving hot rolled products having flat surfaces, rather than round ones, such as either square or rectangular bars and billets. The foregoing embodiment may be modified as described below to accommodate such installations.

One portion of the foregoing embodiment which requires modification is defect detecting apparatus 11. Here a motor-driven planar rotating probe adapted for cyclical scanning of the moving flat surface is substituted for the probe adapted to revolve about round bar 10. The planar probe rotational axis is aligned perpendicularly to, and located preferably centrally across, the moving flat surface to be inspected. During rotation, the probe follows a circular pathway from side to side of said surface, and preferably beyond said sides while producing electrical signals representing defects in said surface. The probe has an angular displacement of 360° per scanning cycle. However only a portion of this angular displacement, say an arc of 90°, is used for inspection purposes and this inspection may be centrally located between the sides of the flat surface to be inspected. Processing of the probe electrical signals appearing on lead 14 may be limited to the inspection arc as noted below.

A probe-driven encoder similar to that referred to above is also used with the planar rotating probe. This encoder, however, generates a keyed sequence of N incremental scanning position pulses during the inspection arc of probe rotation, rather than during one complete scanning cycle. Thus, presuming that the inspection arc were 90°, the encoder would generate 4N pulses in one scanning cycle and these pulses would appear on lead 15. Under these same conditions, the key pulse generated would start at the beginning of each scanning cycle, endure for as long as, or longer than, one-half scanning cycle, and appear on lead 16.

Reference to quadrants as a sub-division of the surface to be inspected should be changed to sections of said surface with respect to the remainder of the inspection apparatus.

Also requiring modification is quadrant designation counter and selector 44. Here the counter is expanded to count 4N, rather than N, scanning incremental position pulses per scanning cycle. The first group of N incremental pulses occur in the inspection arc and have correspondence with adjacent longitudinally extending incremental surfaces disposed across the entire surface to be inspected. The counter is also adapted to generate an inspection gating control pulse which endures for the first group of N incremental scanning position pulses. The counter also sub-divides the first group of N incremental pulses into four sections and the classifying circuitry causes the generation of the sequence of four section gate control pulses which are transmitted over leads 45–48. Each pulse is present only during one of the four different adjacent sections within the inspection arc. Each section gate control pulse may endure for the same number of incremental scanning position pulses. Or, for example, the first and fourth section pulses may endure longer than the second and third section pulses. In the latter case, a defect may be located more precisely due to the necessity to translate rotary motion of the probe into linear displacement of the incremental surfaces laterally across the entire surface to be inspected.

The first and second shift pulses also produced by the quadrant designation counter and selector 44 also endure for the first two and last two section gating pulses, respectively, and occur every other scanning cycle. These first and second shift pulses are also transmitted over leads 49, 50, respectively.

In order that the electrical signals produced by the probe may be processed only during the inspection arc, that is, only during the probe's first movement across the entire surface to be inspected as compared to the entire scanning cycle, and in order to maintain a proper frame of reference of defects detected in the inspection arc but in no other part of the scanning cycle, a gating circuit is inserted in lead 14 to enable passage of the electrical defect signals only during the inspection arc. Likewise, a gating circuit is inserted in that portion of lead 15 which extends to the shifting circuit of correlator 24, when used, to enable passage of the scanning position pulses only during the inspection arc. The gating circuit inserted in leads 14, 15 operate in response to the inspection gating control pulse generated by the modified quadrant designation counter and selector 44 referred to immediately above.

With the exception of defect marking apparatus 12, the remainder of system components in the modified embodiment which provides the capability of detecting, locating, classifying and marking defects on an elongated moving product having a flat surface to be inspected is substantially the same as the foregoing embodiment directed to these same capabilities with respect to a similar product having a round surface to be inspected. Defect marker apparatus 12 is modified to orient the paint sprayers in a plane perpendicularly across the flat surface to be inspected, one in each section of the entire surface, as opposed to being located in a circular plane about a round surface to be inspected.

We claim:

1. Method of detecting and locating defects in a member, comprising:
   a. scanning a surface of said member for defects by means of a probe that produces electrical signals representing true and randomly occurring false defects detected in said member,
   b. generating scanning position pulses in synchronism with said scanning, said pulses having correspondence with the location of adjacent increments of the surface scanned,
   c. passing said electrical signals through circuit means to produce true and randomly occurring false defect pulses whenever any of said electrical signals differ from at least one predetermined waveform,
   d. processing the true and false defect pulses through circuit means in response to said scanning position pulses to pass only recurring true defect pulses and reject said randomly occurring false defect pulses, and
   e. utilizing only the true defect pulses ad the scanning position pulses to locate only true defects detected in said member.

2. Method of detecting and locating defects in a member, comprising:
   a. scanning a surface of said member cyclically for defects by means of a probe that produces electrical defect pulses representing defects detected in said member, b. generating a cyclic sequence of scanning position pulses in synchronism with said scanning, said pulses having correspondence with the locations of adjacent increments of the surface scanned, c. passing said electrical signals through circuit means to produce defect pulses whenever any of said electrical signals differ from at least one predetermined waveform, d. processing said defect pulses through circuit means in response to the scanning position pulses to correlate the coincidence of an instantaneous defect pulse with a stored defect pulse from one or more previous scanning cycles in order to pass said defect pulses, said stored pulse occurring in either the same, a leading or a lagging incremental surface position in the previous scanning cycle; and e. utilizing the processed defect pulses and the scanning position pulses to locate either a straight or a skewed defect detected in said member.

3. The method of claim 2 wherein the defect pulses are processed through correlating circuitry in order to be passed on for subsequent usage.

4. Method of detecting defects in a member and classifying said defects according to location and length, comprising:

a. scanning a surface of said member cyclically for defects using a probe that produces electrical defect pulses representing defects detected in said member, b. generating a cyclic sequence of scanning position pulses in synchronism with said scanning, said pulses having correspondence with the locations of adjacent increments of the surface scanned, c. passing said electrical signals through circuit means to produce defect pulses whenever any of said electrical signals differs from at least one predetermined waveform, d. processing the defect pulses through circuit means in response to the scanning position pulses to pass said defect pulses which reoccur in a predetermined portion of one or more scanning cycles, and e. utilizing the processed defect pulses and the scanning position pulses to classify defects detected in said member according to severity and length, the latter being based on reoccurrence of said defect in a plurality of scanning cycles.

5. Method of detecting defects in a member and classifying said defects according to severity, location and length, comprising:

a. scanning a surface of said member for defects using a probe that produces electrical defect pulses representing defects detected in said member, b. generating a cyclic sequence of scanning position pulses in synchronism with said scanning, said pulses having correspondence with the locations of adjacent increments of the surface scanned, c. passing said electrical signals through circuit means to produce a plurality of different kinds of defect pulses, each kind representing a different defect severity, whenever any of said electrical signals differs from at least one predetermined waveform associated with each kind of defect severity, d. processing at least one of the kinds of defect pulses through circuit means in response to the scanning position pulses to pass said defect pulses which reoccur in a predetermined portion of one or more scanning cycles, and e. utilizing the processed and unprocessed defect pulses and the scanning position pulses to classify the defects detected in one or more portions of said member according to severity, location and length, the latter being based on reoccurrence of said defect in a plurality of scanning cycles.

6. Apparatus for detecting and locating defects in a member comprising:

a. defect detecting means including a probe adapted to scan a surface of said member for producing electrical signals representing true and randomly occurring false defects detected in said member, b. means including an encoder synchronized with probe scanning for generating scanning position pulses having correspondence with the location of adjacent increments of the surface scanned, c. circuit means responsive to electrical signals for producing true and randomly occurring false defect pulses whenever any of said electrical signals differs from a predetermined waveform, d. circuit means for processing the true and false defect pulses in response to said scanning position pulses so as to pass only recurring true defect pulses and reject said randomly occurring false defect pulses, and e. circuit means for utilizing only the true defect pulses and the scanning position pulses to locate only true defects in said member.

7. Apparatus for detecting and locating defects in a member, comprising:

a. defect detecting means including a probe adapted to scan a surface of said member cyclically for producing electrical signals representing defects detected in said member, b. means including an encoder synchronized with probe scanning for generating a cyclic sequence of scanning position pulses having correspondence with the location of adjacent increments of the surface scanned, c. circuit means responsive to said electrical signals for producing defect pulses whenever any of said electrical signals differs from at least one predetermined waveform, d. circuit means for processing the defect pulses in response to the scanning pulses, said means correlating the coincidence of an instantaneous defect pulse with a stored defect pulse from one or more previous scanning cycles in order to pass said defect pulses, said stored pulse occurring in either the same, a leading or a lagging incremental surface position in the previous scanning cycles, and e. circuit means for utilizing the processed defect pulses and the scanning position pulses to locate either a straight or a skewed defect detected in said member.

8. The apparatus of claim 7 wherein said circuit means (d) includes:

1. signal correlating means responsive to said defect pulses and said scanning position pulses for determining the coincidence of said instantaneous and stored pulses.

9. Apparatus for detecting defects in a member and classifying said defects according to location and length, comprising:

a. defect detecting means including a probe adapted to scan a surface of said member cyclically for producing electrical signals representing defects in said member, b. means including an encoder synchronized with probe scanning for generating a cyclic sequence of scanning position pulses having correspondence with the location of adjacent increments of the surface scanned, c. circuit means responsive to said electrical signals for producing defect pulses whenever any of said electrical signals differs from at least one predetermined waveform, d. circuit means for processing said defect pulses in response to the scanning position pulses so as to pass said defect pulses which reoccur in a predetermined portion of one or more scanning cycles, and e. circuit means for utilizing the processed defect pulses and the scanning position pulses to classify the defects detected in said member according to severity and length.

10. Apparatus for detecting defects in a member and classifying said defects according to severity, location and length, comprising:

a. defect detecting means including a probe adapted to scan a surface of said member cyclically, said means adapted to produce electrical signals representing defects in said member, b. means including an encoder synchronized with probe scanning for generating a cyclic sequence of scanning position pulses having correspondence with the location of adjacent increments of the surface scanned, c. circuit means responsive to said electrical signals for producing a plurality of different kinds of defect pulses, each kind representing a different defect severity, whenever any of said electrical signals differs from at least one predetermined waveform associated with each kind of defect severity, d. circuit means for processing at least one of the kinds of defect pulses in response to the scanning position pulses so as to pass said one kind of defect pulses which reoccur in a predetermined portion of one or more scanning cycles, and e. circuit means for utilizing the processed and unprocessed defect pulses and the scanning position pulses to classify the defects detected in said member according to severity, location and length.

11. Apparatus for detecting defects in an elongated member and classifying said defects according to severity, length and location in a longitudinally extending section of said member, comprising:

a. defect detecting means adapted to scan a surface of the elongated member cyclically during relative lengthwise movement therewith, said means producing electrical defect signals representative of defects detected in said member during said scanning, b. first defect signal detecting means for producing first level defect pulses whenever the electrical defect signals differ from at least one predetermined waveform representing a first level of defect severity, c. encoding means synchronized with means (a) scanning cycle for generating a keyed sequence of scanning position pulses in each cycle, each said pulses having correspondence with a plurality of adjacent, longitudinally extending, incremental surfaces traversed by means (a) during scanning of said elongated member surface, d. first electrical circuit means receiving the means (c) keyed sequence of pulses for producing a plurality of sequential gate control pulses and a plurality of shift pulses, each of said gate control pulses enduring for a different group of scanning position pulses and corresponding to a different adjacent section of said incremental surfaces, said shift pulses occurring once at least every other scanning cycle and in synchronism with a predetermined number of the gate control pulses, e. a plurality of gating circuits each receiving the first level defect pulses and each operating in response to a different gate control pulse for enabling passage of only those defect pulses which occur in the section of said member where said defects were detected, f. second electrical circuit means, including a plurality of signal storing and transferring means each connected to a different means (e) output and operating in response to means (d) shift pulses, for incrementally delaying corresponding sections of defect pulses from passage to respective output circuit means for a predetermined number of scanning cycles, and g. third electrical circuit means utilizing the plurality of means (f) outputs for classifying the defects detected in said elongated member according to a predetermined level of defect severity, length with regards to a predetermined number of scanning cycles, and location in one of the longitudinal sections of said member.

12. The apparatus of claim 11 further including:

h. second defect signal detecting means for producing second level defect pulses whenever the electrical defect signals differ from at least one predetermined waveform representing a second level of defect severity, and i. the third electrical circuit means is adapted to also utilize means (h) output for classifying second level defects.

13. The apparatus of claim 11 wherein the electrical defect signals produced by means (a) comprise random false defect signals intermixed with true defect signals which are recurrable in at least one successive scanning cycle, and wherein means (b) correspondingly produces recurrable true and random false first level defect pulses, said apparatus including:

j. signal correlating means receiving said true and false defect pulses from means (b), and operating in response to the scanning position pulses from means (c), for passing true defect signals to means (e) which reoccur in one or more scanning cycles and rejecting random false defect signals.

14. The apparatus of claim 13 wherein signal correlating means (j) comprises:

k. fourth electrical circuit means, including signal storing and transferring means connected to means (b) output and operating in response to the scanning position pulses from means (c), for storing and transferring the true and false defect pulses through a plurality of incremental storage stages situated between a storage input circuit and a predetermined number of storage output circuits, said outputs corresponding to cyclic increments of single, multiple, or related fractional cycles of scanning history, and l. fifth electrical circuit means, including a correlator output means, operating under one of a number of correlating modes for enabling the comparison of the means (b) output with at least one of the means (k) outputs, said fifth electrical circuit means passing a true defect pulse to the correlator output means when coincidence occurs between an instantaneous true defect pulse and a stored true defect pulse, said circuit means rejecting random false defect pulses.

15. The apparatus of claim 14 wherein means (k) includes:

m. shift register means for storing and transferring the true and false defect pulses stepwise between said input and output circuits, said shift register means having M sections of at least N stages of serially-connected binary storage elements per section, each of the binary elements having a shift circuit operative in response to the scanning position pulses from means (c).

16. The apparatus of claim 15 wherein shift register means (m) includes:

n. at least 2N stages with outputs tapped at N and 2N stages connected to circuit means (l).

17. The apparatus of claim 15 wherein shift register means (m) includes:

o. at least 2N stages with outputs tapped at N, 2N and other predetermined stages adjacent N, 2N or N and 2N stages connected to circuit means (l).

18. The apparatus of claim 14 wherein circuit means (l) includes:

p. correlating mode selecting means for providing separate selection signals so that signal correlation may take place during either the same, or one or more leading or lagging, recurring increments of the scanning cycle, and q. logic means operating under control of the correlating mode selection signals for enabling the comparison of means (b) output with means (k) outputs and the passage of the true defect pulse.

19. The apparatus of claim 11 wherein means (f) plurality of signal storing and transferring means consists of:

r. a plurality of shift registers each connected to a different means (e) output, and operating in response to the shift pulses from means (d), for storing and transferring the sectional defect pulses throughout a plurality of incremental storage stages to effect said incremental delay of the respective deflect pulses.

20. The apparatus of claim 11 wherein second electrical circuit means (f) comprises:

s. a plurality of shift registers each connected to a different means (e) output, and operating in response to the shift pulses from means (d), for storing and transferring the sectional defect pulses through a plurality of incremental storage stages to effect said incremental delay of the respective defect pulses, said plurality of stages corresponding to a predetermined number of scanning cycles and having a plurality of outputs tapped at preselected stages, and t. means receiving the plurality of outputs from each of the plurality of shift registers for preselecting the same incremental delay for each shift register from a variety of such delays and providing a plurality of outputs with delayed defect pulses, each output being related to a different one of the aforesaid longitudinal sections of the elongated member.

21. The apparatus of claim 11 wherein third electrical circuit means (g) includes:
   u. defect marking means operatively associated with the elongated member under test and including a plurality of marker units, a predetermined number of said marker units being responsive to a different one of the means (f) output circuits, for marking the elongated member where defects occur according to said classification.

22. The apparatus of claim 12 wherein third electrical circuit means (g) includes:
   v. defect marking means operatively associated with the elongated member under test and including a plurality of marker units, a first predetermined number of said marker units being responsive to a different one of the means (f) output circuits, a second predetermined number of said marker units being responsive to means (h) output circuit, said defect marking means marking the elongated member where first and second level defects occur according to said classification.

23. The apparatus of claim 22 wherein the first predetermined number of marker units is responsive to means (h) output instead of means (f) output, or alternatively means (f) and means (h) outputs.

* * * * *